United States Patent [19]

Simmonds, Jr. et al.

[11] Patent Number: 4,681,650

[45] Date of Patent: Jul. 21, 1987

[54] POWDER REINFORCING LAMINATE APPARATUS

[75] Inventors: Robert C. Simmonds, Jr., Boxford; Douglas H. Crowell, Beverly; John F. Martin, Essex, all of Mass.

[73] Assignee: USM Corporation, Farmington, Conn.

[21] Appl. No.: 838,086

[22] Filed: Mar. 10, 1986

[51] Int. Cl.[4] .............................................. B32B 31/12

[52] U.S. Cl. .................................... 156/378; 118/667; 118/713; 156/379; 156/499

[58] Field of Search .......................... 12/146 D, 61 A; 156/359, 378, 379, 499; 250/338, 352, 360.1; 118/667, 713, 308

[56] References Cited

U.S. PATENT DOCUMENTS 4,063,527 12/1977 Gorini et al. .................... 118/202 X
4,480,581 11/1984 Simmonds et al. .................... 118/50
4,528,710 7/1985 Simmonds et al. ............... 12/146 D
4,592,798 6/1986 Simmonds et al. ................. 156/578

*Primary Examiner*—Robert A. Dawson
*Attorney, Agent, or Firm*—Spencer T. Smith

[57] ABSTRACT

A machine for depositing powder in a selected configuration, fusing the configured powder into a laminate and adhering the fused laminate to a shoe substrate. A heater raises the temperature of configured powder to fuse the powder into a laminate. A pair of radially spaced holes extend downwardly through the heater through which a fused laminate underlying the holes can be observed. Configured powder is conveyed past the heater to fuse the configured powder into a fused laminate, and a remote temperature sensor is controllably displaceable from one location to a second location so that the temperature of a fused laminate below either one of said apertures can be sensed. The temperature sensor is secured at either of the two discrete locations, and the holes can be closed by pivotally mounted caps.

5 Claims, 3 Drawing Figures

POWDER REINFORCING LAMINATE APPARATUS

SPECIFICATION

The present invention relates to machines which deposit powder in a selected configuration, fuse the configured powder into a laminate and adhere the fused laminate to a shoe substrate to reinforce the substrate.

In such machines, the configured powder is carried by a conveyor past a series of heaters which progressively raise the temperature of the power. To retain the heat within the heating zone, the heaters which are located above the conveyer are isolated from the top supporting plate of the machine by a layer of insulation.

It is an object of the present invention to confirm that the temperature of the configured powder has been raised to a level sufficient to properly fuse the powder into the desired laminate before the laminate is adhered to the shoe substrate.

Other objects and advantages of the present invention will become apparent from the following portion of this specification and from the accompanying drawings which illustrate in accordance with the mandate of the patent statues a presently preferred embodiment incorporating the principles of the invention.

Referring to the drawings.

Figure 1:
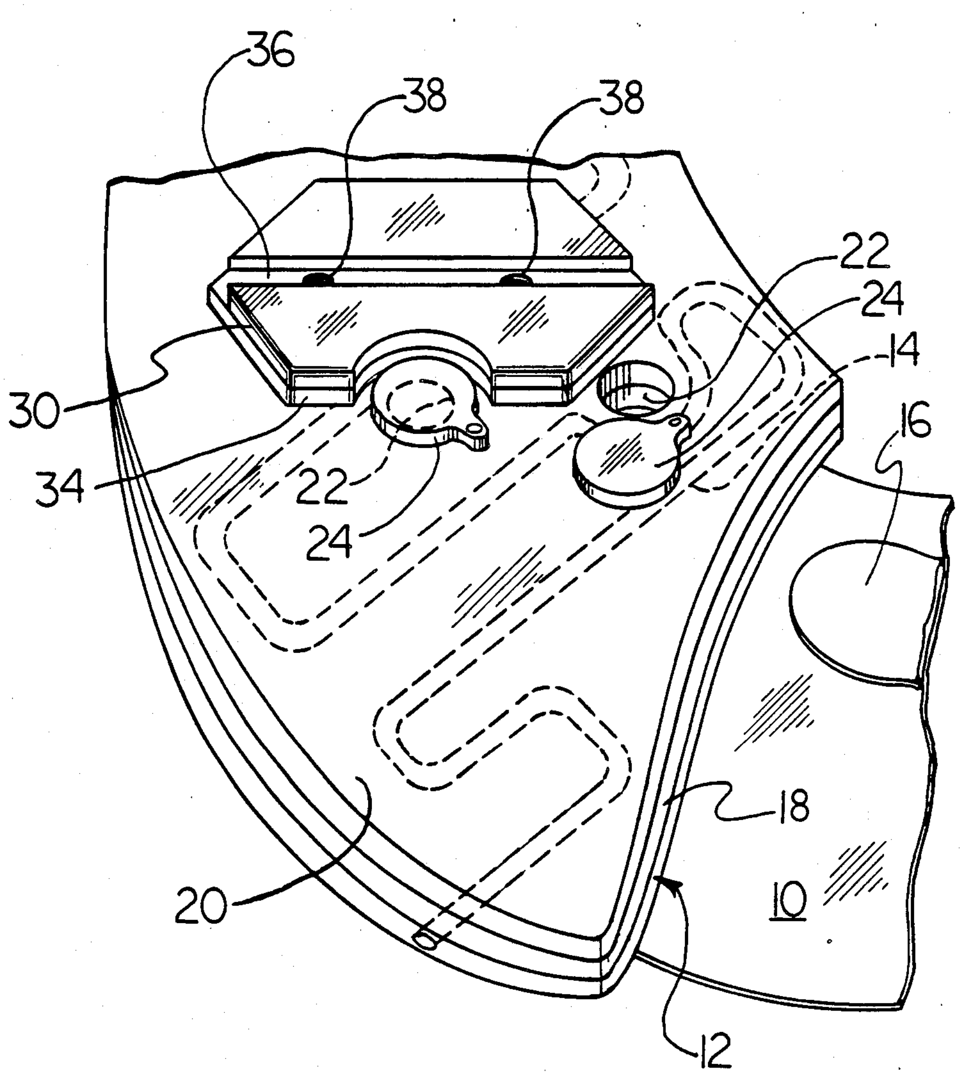
FIG. 1 is a top oblique view of a portion of the heating zone of a machine which deposits powder in a selected configuration, fuses the powder into a laminate and adheres the fused laminate to a shoe substrate.
Figure 3:
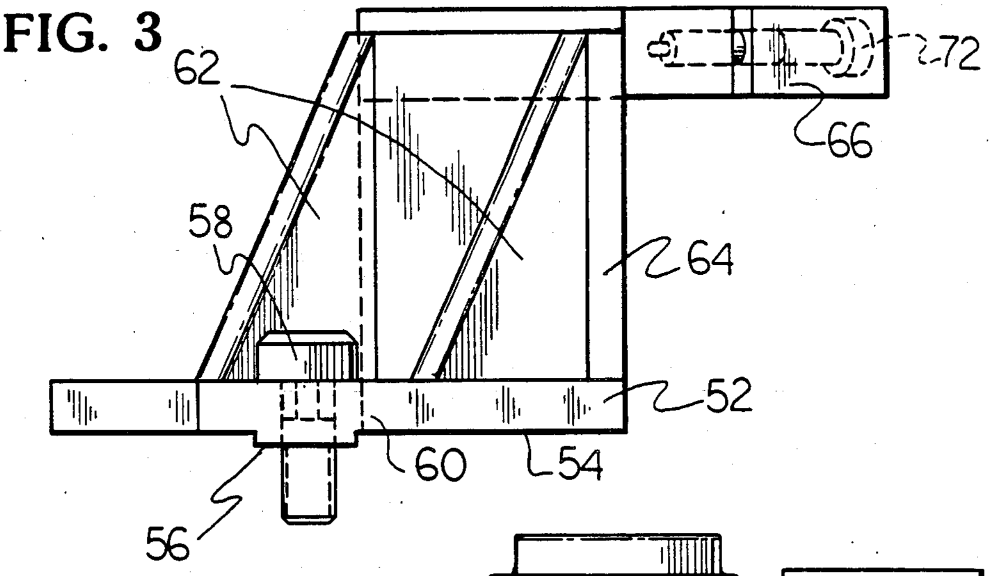
FIG. 3 is a side elevational view of the mounting bracket of the temperature sensing assembly.

In state of the art machines such as are disclosed in detail in U.S. Pat. No. 4,528,710, powder is deposited on the top surface of the conveyor belt 10 at a deposition location (not shown) and is carried by the conveyor belt (here an annular horizontal belt rotated about a vertical axis) through an extended heating zone. The temperature of the deposited powder is progressively elevated until it becomes fused into a laminate and the fused laminate 16 is then conveyed to a join and cool station (not shown) where it will be adhered to a shoe substrate. The end portion of the heating zone is shown in FIG. 1 and includes a heating element 12 located above the conveyor belt. The heater element 12 includes a heating coil 14.

A layer of insulation 18 is located above the heater element 12 to contain the generated heat and located above the layer of insulation 18 is the support plate 20 of the machine. A pair of radially spaced vertical observation holes 22 are defined to extend downwardly through the support plate 20, the insulation layer 18 and the heater element 12 so that the fused laminate can be viewed. The heating coils 14 are deformed around one or both of these openings and pivotally mounted caps 24 are secured to the support plate 20 to selectively close these openings to minimize heat loss. Also secured to the top surface of the support plate is a guide track 30 which has a flat upper surface 32. Located between the guide track 30 and the support plate 20 is a layer of insulation 34. An extended slot or keyway 36 is defined in the upper surface 32 of the guide track and two spaced threaded bores 38 are defined in the lower surface of this slot.

Figure 2:
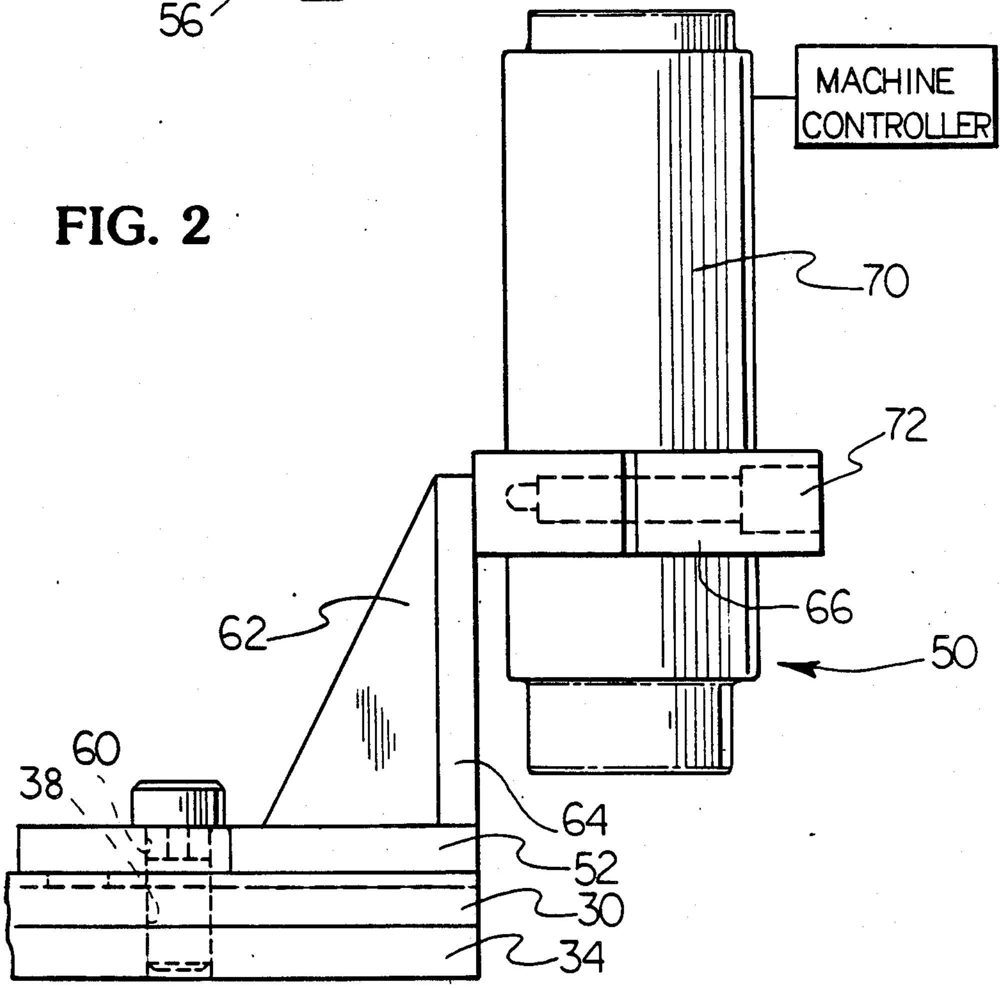
FIG. 2 is a side view of the temperature sensing assembly of the machine which is secured in position on the supporting plate of the machine.

Secured to the support plate is a temperature sensing assembly 50 (FIG. 2) which includes a mounting plate 52 having a flat bottom mounting surface 54 with a downwardly projecting linear key 56. The key 56 is placed in the guide track keyway 36 for keyed movement relative to the guide track 30. A locking bolt 58 extends downwardly through a hole 60 in the mounting plate 52 and is threadedly received by either of the threaded bores 38 in the extended keyway 36 so that the mounting plate 52 can be located at either of two locations. Secured to the mounting plate 52 by suitable struts 62 is a vertical column 64 to which is secured a two piece clamp 66. An infrared temperature sensor 70 is clamped in position by tightening suitable fasteners 72 and will overlie one of the viewing holes 22 depending on the location of the temperature sensing assembly 50 on the guide track 32. The infrared temperature sensor 70 will view a fused laminate through one of the holes and will sense its temperature. Where the temperature is either too high or too low, the Machine Controller may stop the machine and sound an alarm or it may effect appropriate changes such as varying the output of the heater.

What is claimed is:

1. A machine for depositing powder in a selected configuration, fusing the configured powder into a laminate and adhering the fused laminate to a shoe substrate comprising heater assembly means including heater means for raising the temperature of configured powder to fuse the powder into a laminate, and a support plate, said heater assembly having a pair of radially spaced holes extending downwardly through said heater and support plate through which a fused laminate underlying the holes can be observed, conveyor means for conveying configured powder past said heater means to fuse the configured powder into a fused laminate, temperature sensor assembly means including means for remotely sensing temperature, means for controlling the displacement of said temperature sensing means from one location whereat the temperature of the fused laminate below one of said holes will be sensed to a second location whereat the temperature of the fused laminate below the other one of said holes will be sensed so that said temperature sensing means can view the fused laminate below either one of said holes, means for selectively covering said holes.

2. A machine according to claim 1 wherein said controlling means comprises guide track means secured to said support plate having an extended keyway defined in its top surface and a pair of threaded bores defined in said keyway, mounting plate means having an extended downwardly projecting key portion for slidably engaging with said guide track means keyway, and mounting bracket means having means for clamping said temperature sensing means in a selected orientation.

3. A machine according to claim 2, wherein said securing means comprises bolt means extending through said keyed portion of said mounting plate means for threaded insertion into either one of said threaded bores, said threaded bores being selectively located so that when said mounting plate means is bolted to said guide track means at one of said threaded bores, said temperature sensing means will sense the temperature of a fused laminate below a corresponding one of said holes.

4. A machine according to claim 3, wherein said guide track means comprises a guide track and a layer of insulation intermediate said guide track and said support plate.

5. A machine for depositiong powder in a selected configuration, fusing the configured powder into a laminate and adhering the fused laminate to a shoe substrate comprising heater assembly means including heater means for raising the temperture of configured powder to fuse the powder into a laminate, and a support plate, said heater assembly means having a hole extending downwardly through said heater and support plate through which a fused laminate underlying the hole can be observed, conveyor means for conveying configured powder past said heater means to fuse the configured powder into a fused laminate, temperature sensor assembly means including means for remotely sensing temperature, means for securing said supporting means at a location whereat the temperature of the fused laminate can be sensed through said hole, and means for selectively covering said hole.

* * * * *